United States Patent [19]

Friedman et al.

[11] 3,816,810
[45] June 11, 1974

[54] HIGH CURRENT, REGULATED POWER SUPPLY WITH FAULT PROTECTION

[75] Inventors: Edward H. Friedman, Needham; Albert M. Heyman, Bedford, both of Mass.

[73] Assignee: Honeywell Information Systems Inc., Waltham, Mass.

[22] Filed: Jan. 2, 1973

[21] Appl. No.: 320,041

[52] U.S. Cl. .................................. 321/19, 321/11
[51] Int. Cl. ............................................. H02m 1/08
[58] Field of Search .......... 321/2, 11, 18, 19, 45 C; 307/82

[56] References Cited
UNITED STATES PATENTS

| | | | |
|---|---|---|---|
| 3,343,067 | 9/1967 | Mesenhimer | 307/82 X |
| 3,387,201 | 6/1968 | Greenberg et al. | 321/18 |
| 3,452,266 | 6/1969 | Borden et al. | 321/18 |
| 3,461,374 | 8/1969 | Rhyne, Jr. | 321/18 |
| 3,549,977 | 12/1970 | Watkins | 307/82 X |
| 3,663,940 | 5/1972 | Schwarz | 321/19 |
| 3,678,368 | 7/1972 | Popp | 321/11 |
| 3,697,853 | 10/1972 | Nowell et al. | 321/11 |
| 3,743,924 | 7/1973 | Genuit et al. | 321/2 X |

*Primary Examiner*—William M. Shoop, Jr.
*Attorney, Agent, or Firm*—Ronald T. Reiling

[57] ABSTRACT

A power supply for providing a high current at a regulated voltage level while protecting the power supply from damage due to fault conditions. The power supply provides apparatus for rectifying AC input power and, by means of a DC to DC converter, supplies a DC voltage to the output terminal.

The DC output voltage is monitored by feedback circuits. The feedback circuits control the operation of switching elements of the DC to DC converter, and therefore determine the output voltage level, by increasing or decreasing the rate of operation of the switching elements.

Various fault conditions, such as over and under-voltage conditions, etc., are monitored by the fault detection apparatus. The detection of a fault condition causes the power supply to suspend operation. Operation of over-current condition detection apparatus is continually verified.

14 Claims, 5 Drawing Figures

LOAD CURRENT

FIG. 4B

HIGH CURRENT, REGULATED POWER SUPPLY WITH FAULT PROTECTION

BACKGROUND OF THE INVENTION

1. Field of the Invention

This invention relates generally to power supplies and, more particularly, to DC to A inverter power supplies, which use intermediate AC voltages to achieve a DC voltage level conversion.

2. Description of the Prior Art

The use of switching devices, such as the silicon-controlled rectifiers (SCR), for inverting circuits (i.e., for changing a DC voltage to an AC voltage) or in a DC to DC converter circuit (i.e., changing a DC voltage to a DC voltage of a different magnitude) is known in the prior art. (cf Silicon Controlled Rectifier Manual; F.W. Gutzwiller, Editor; General Electric Company; Auburn, N.Y., 1961; or Semiconductor Controlled Rectifiers: Principles and Applications of p-n-p-n Devices; Prentic-Hall Inc.; Englewood Cliffs; N.J., 1964). These circuits can be incorporated into a power supply.

The presence of switching devices in a power supply permits the regulation of the output voltage to be handled with a variety of techniques. The problem of regulation is especially severe when the power supply is designed to delivery high current. The manipulation of the high current frequently requires expensive circuit elements as well as elaborate associated circuitry.

In a power supply in which the DC voltage used in an inverter circuit or in a DC to DC converter circuit is supplied by the charge on a storage capacitor, apparatus must be provided for limiting the initial surge of current into the storage capacitor, while removing the limiting device during normal operation.

A power supply is frequently used with a wide range of input power AC voltage levels. Apparatus must be provided to permit the operation of a power supply under a variety of voltage conditions, without affecting the performance and without requiring additional elaborate apparatus.

A variety of fault conditions can occur which are potentially damaging to the elements of a power supply or to the apparatus receiving energy from the power supply. Apparatus must be provided for monitoring certain parameters of the power supply so that the presence of a fault condition can be detected and appropriate action taken in response to the fault condition.

An especially damaging condition occurs when current, exceeding a predetermined value, is drawn from the power supply. It is desirable therefore to verify the operation of the apparatus monitoring the magnitude of the current.

OBJECTS

It is an object of the present invention to provide an improved power supply.

It is still another object of the present invention to disable a power supply upon detection of any one of several power supply fault conditions.

It is still a further object of the present invention to disable the operation of a power supply in the event that current, in excess of a predetermined value is delivered by the power supply.

It is more particular object of the present invention to verify the operation of the apparatus monitoring the value of current delivered by a power supply.

It is still another object of the present invention to utilize a wide range of input power AC voltage levels by minor adjustments in a power supply.

It is yet another object of the present invention to provide inrush-current limiting apparatus which is removed during normal operation of a power supply.

It is a more particular object of the present invention to regulate the output voltage by controlling the rate of operation of an inverter circuit associated with the power supply.

It is yet a further object of the present invention to react to detected fault conditions by disabling the operation of an inverter circuit, in a power supply where the operation of the inverter circuit controls the output voltage.

It is yet a further object of the present invention to provide duplicate power trains, which can be connected in series or in parallel, for use with a wide range of input power AC voltage levels.

SUMMARY OF THE INVENTION

The aforementioned and other objects of the present invention are accomplished by providing a power supply capable of operation over a range of voltages, having regulations apparatus for regulating the output voltage, having fault detection apparatus for sensing the presence of a fault conditions, and having an inrush-current limiting device which does not affect normal operations.

The power supply, power train is composed of an inverter circuit. The output signal of the inverter circuit is rectified and filtered to produce an output voltage. A storage capacitor supplying the inverter circuit is protected by an inrush-current limiting device which does not affect normal operation.

The regulation of the power supply is accomplished by resulating apparatus which compares the output voltage with a reference voltage source. The difference between the two voltage levels establishes a rate of operation of the inverter circuit, thereby causing the output voltage to be maintained at a level determined by the reference voltage level.

Fault detection apparatus is provided for monitoring under- and over- voltage conditions of the output voltage, for over-current conditions of the output current, and for excessive power supply heating. Detection of the presence of any fault condition is signalled to the regulating apparatus, which terminates the operation of the inverter circuits.

The power supply is provided with two power trains which may be connected in series or in parallel and which therefore can operate over a range of voltage value approximately twice the device the range possible with a single power train.

DESCRIPTION OF THE PREFERRED EMBODIMENT

1. Detailed Description of the Figures

Figure 1:
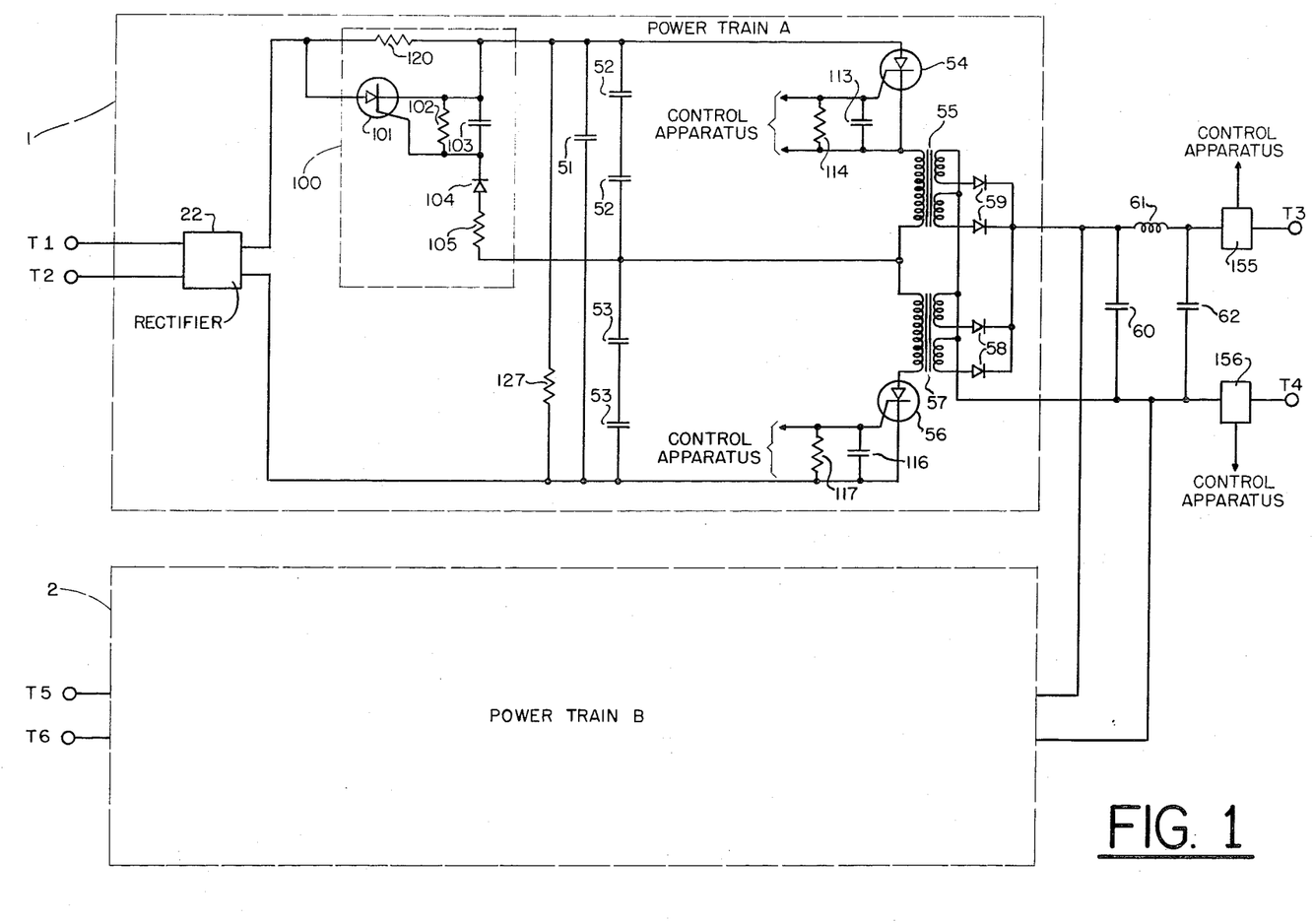
FIG. 1 is a circuit diagram of the power train portion of the high current power supply.

Referring now to FIG. 1, alternating current is from an input power source applied to terminals T1 and T2 of Power Train A of a power supply. The alternating voltage applied to terminals T1 and T2 is applied to input terminals of Rectifier 22. One output terminal of Rectifier 22 is coupled to a first terminal of resistor 120 and to an anode terminal of a silicon-controlled rectifier (SCR) 101. A second terminal of resistor 120 is coupled to a cathode terminal of SCR 101, through resistor 127 to a second output terminal of Rectifier 22, through capacitor 51 to the second output terminal of Rectifier 22, to an anode of SCR 54 and to a first terminal of capacitor 52. A gate terminal of SCR 101 is coupled through resistor 102 to the cathode terminal of SCR 101, through capacitor 103 to the cathode terminal of SCR 101, and through diode 104 and resistor 105, connected in series, to a second terminal of capacitor 52. The elements enclosed by the dotted line, labeled 100, comprise the inrush-current limiting device.

The gate element of SCR 54 is coupled to the cathode element of SCR 54 through capacitor 113, through resistor 114, and through the control apparatus. The cathode terminal of SCR 54 is coupled to a first terminal of an input winding of transformer 55. A second terminal of the input winding of transformer 55 is coupled to the second terminal of capacitor 52, and to a first terminal of the input winding of transformer 57. A second terminal of the input winding of transformer 57 is coupled to an anode of SCR 56. The gate terminal of SCR 56 is coupled to the cathode element of SCR 56 through capacitor 116 through resistor 117 and through the control apparatus. The cathode terminal of SCR 56 is also coupled to the second output terminal of rectifier 22, and in addition the cathode is coupled through capacitor 53 to the second terminal of capacitor 52.

First terminals of multiple output windings of transformer 55 are coupled through diodes 59 to a first terminal of inductor 61. Second terminals of the output windings of transformer 55 are coupled to terminal T4. Similarly, first terminals of output windings of transformer 57 are coupled through diodes 58 to a first terminal of an inductor 61. Second terminals of the output windings of transformer 57 are coupled to terminal T4. Terminal T4 is coupled through capacitor 60 to a first terminal of inductor 61. T4 is also coupled through capacitor 62 to a second terminal of inductor 61 which is coupled to terminal T3. At terminals T3 and T4, apparatus for coupling these terminals to the control apparatus, labelled 155 and 156, respectively are shown.

The dotted line, labelled 1, encloses Power Train A. In the preferred embodiment, the power supply also contains similar apparatus shown in FIG. 1 as Power Train B and labelled 2. Power Train B contains input terminals T5 and T6 while the output terminals of Power Train B are coupled to T4 and to the first terminal of inductor 61.

Figure 2:
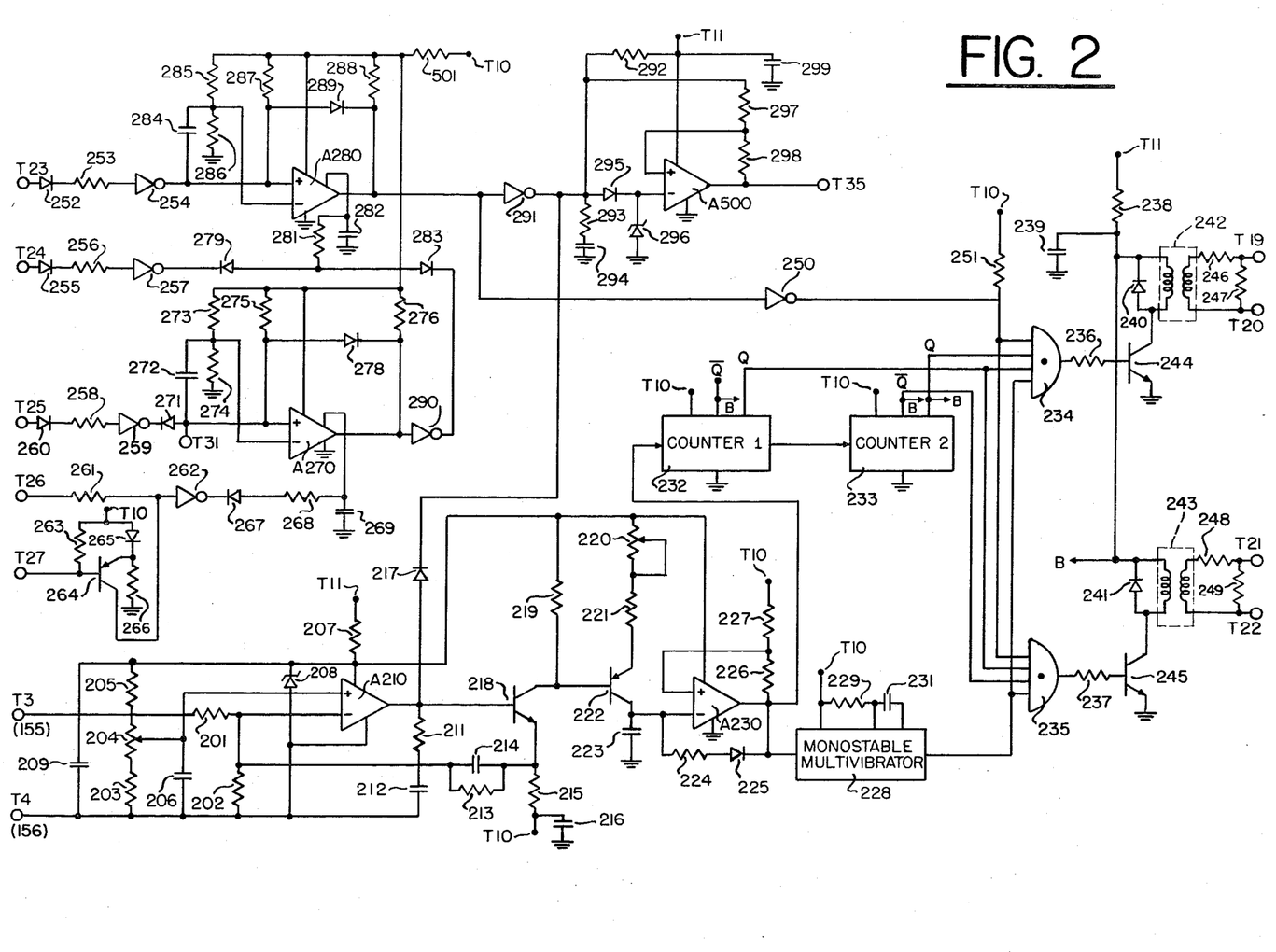
FIG. 2 is a circuit diagram of the voltage regulating portion of the control apparatus for regulating the output voltage of the power supply.

Referring next to FIG. 2, the voltage regulating apparatus is shown. Terminals T3 and T4 are coupled to the power supply output terminals T3 and T4, shown in FIG. 1 by coupling apparatus 155 and 156. Terminal T3 is coupled through resistor 201 to a second input terminal of operational amplifier A210. The second input terminal of operational amplifier A210 is coupled through resistor 202 to terminal T4. The second input terminal of operational amplifier A210 is also coupled through resistor 213 and capacitor 214 connected in parallel, to an emitter of NPN transistor 218. The emitter of transistor 218 is coupled through resistor 215 to terminal T10. Terminal T10 is also coupled through capacitor 216 to a common connection. Terminal T4 is coupled through capacitor 209 to a first terminal of resistor 207. The second terminal of resistor 207 is coupled to terminal T11. The first terminal of resistor 207 is coupled to a supply terminal of operational amplifier A210, to a cathode of Zener diode 208, and to a first terminal of resistor 205. An anode of Zener didoe 208 is coupled to the common terminal of operational amplifier A210 and to terminal T4. The second terminal of resistor 205 is coupled through potentiometer resistor 204 and resistor 203 to terminal T4. The variable tap of potentiometer 204 is coupled to a first input terminal of operational amplifier A210 and through capacitor 206 to terminal T4. The output terminal of operational amplifier A210 is coupled to a base of transistor 218, an anode of diode 217, and through resistor 211 and capacitor 212, connected in series, to terminal T4. A collector of transistor 218 is connected to a base of transistor 222 and through resistor 219 to the first terminal of resistor 207. Operational amplifier A210 and transistor 218, with associated elements, combine to produce a voltage signal at the collector terminal of transistor 218 determined by the voltage between terminal T3 and terminal T4 and a portion of the voltage determined by Zener diode 208.

The collector of PNP transistor 222 is coupled through capacitor 223 to ground, to a second terminal of operational amplifier A230, and to a first terminal of resistor 224. The emitter of PNP transistor 222 is coupled through resistor 221 and potentiometer 220, connected in series, to the first terminal of resistor 207. The tap of potentiometer 220 is coupled to one of the potentiometer terminals. The second terminal of resistor 224 is coupled to an anode of diode 225. A cathode of diode 225 is coupled to the input of a monostable multivibrator 228, an output of operational amplifier A230, a first terminal of resistor 226, and to an input terminal of a binary counter 232. A second terminal of resistor 226 is coupled to a first input of operational amplifier A230 and through resistor 227 to terminal T10. A supply terminal of operational amplifier A230 is coupled to the first terminal of resistor 207, while a common terminal of A230 is coupled to a common connection. Transistor 222 and operational amplifier A230, along with the associated circuit elements, produce a series of pulses whose frequency is determined by the voltage at the collector of transistor 218. The value of capacitor 223 is arranged to be altered, thereby providing an adjustment in the frequency of a signal at the output terminal of A230.

The monostable multivibrator 228 is coupled to terminal T10, resistor 229, and capacitor 231. The resistor and capacitor determine the duration of the pulse at an output terminal of the monostable multivibrator 228. The output terminal of the monostable multivibrator 228 is coupled to a first terminal of logic AND gate 235 and to the first terminal of logic AND gate 234.

The output of counter 232, is coupled to counter 233. One counter 232 state signal Q, is coupled to a second terminal of AND gate 234, and to a second terminal of AND gate 235. One state signal Q, of counter 233 is coupled to a third terminal of AND gate 234, while the inverse state signal $\bar{Q}$ of counter 233 is coupled to a third terminal of AND gate 235. A fourth input terminal of AND gate 234 and a fourth input terminal of AND gate 235 are coupled to an output terminal of inverter amplifier 250 and, through resistor 251, to terminal T10. An output terminal of AND gate 235 is coupled through resistor 237 to a base connection of NPN transistor 245. An emitter of transistor 245 is coupled to the common connection, while a collector of transistor 245 is coupled to an anode of diode 241, and to one terminal of a primary winding of transformer 243. A second terminal of the primary winding of transformer 243 is coupled to a cathode of diode 241, through resistor 238 to terminal T11 and through capacitor 239 to the common connection. One terminal of a secondary winding of transformer 243 is coupled to terminal T22 while a second terminal of the secondary winding of transformer 243 is coupled through resistor 248 to terminal T21. Terminal T21 is coupled through resistor 249 to terminal T22. An output terminal of AND gate 234 is coupled through resistor 236 to a base connection of NPN transistor 244. An emitter of transistor 244 is coupled to the common connection, while a collector of transistor 244 is coupled to an anode of diode 240 and to a first terminal of a primary winding of transformer 242. A second terminal of the primary winding of transformer 242 is coupled to the cathode of diode 240 and through resistor 238 to terminal T11. A first terminal of a secondary winding of transformer 242 is coupled to terminal T20, while a second terminal of the secondary winding transformer 242 is coupled through resistor 246 to terminal T19. Terminal T19 is coupled through resistor 247 to terminal T20.

A signal is applied across terminals T19 and T20 every fourth cycle count of an error frequency signal at the output terminal of amplifier A230. Similarly a signal is applied across terminals T21 and T22 every fourth cycle count of an error frequency signal at the output terminal of amplifier A230. However, the signal between terminals T21 and T22 occurs on the second error frequency count after the signal between terminals T19 and T20. In either case, the duration of the signals between terminals T21 and T22 or between T19 and T20 is determined by an enabling pulse from the monostable multivibrator 228.

Terminals T19 and T20 are coupled to SCR 54, while terminals T21 and T22 are coupled to SCR 56. The signals on those terminals alternately bias SCR 54 and SCR 56 in the conducting state, causing the operation of the inverter circuit.

The inverse signal $\bar{Q}$ of counter 232, the signal Q and inverse signal $\bar{Q}$ of counter 233 resistor 238 and the output of monostable multivibrator 228 are coupled to circuits similar to AND gate 234 and AND gate 235. These logic gates and associated circuitry control an inverter circuit In Power Train B in a manner similar to, but out of phase with, the SCR inverter operation of Power Train A.

Terminal T23 is connected through diode 252, resistor 253, and inverter amplifier 254 to a first input terminal of operational amplifier A280. The first input terminal of operational amplifier A280 is also connected to the anode of diode 289, and through resistor 287, to a first terminal of resistor 501. A second terminal of resistor 510 is coupled to terminal T10. In addition, the first terminal of resistor 510 is coupled to a supply terminal of operational amplifier A280, through resistor 288 to the output terminal of operational amplifier A280, and to a first terminal of resistor 285. A second terminal of resistor 285 is coupled to a second input terminal of operational amplifier A280, through resispacitor 284 to the first input terminal of operational amplifier A280. An output terminal of operational amplifier A280 is coupled to a cathode of diode 289, to an input terminal of inverter amplifier 291 and to an input terminal of inverter amplifier 250. An output terminal of inverter amplifier 291 is coupled to a cathode of diode 217, through resistor 292 to terminal T11, through resistor 297 to a first terminal of operational amplifier A500, to an anode of diode 295, and through resistor 293 and capacitor 294, connected in series, to the common connection. The cathode of diode 295 is coupled to a second input terminal of operational amplifier A500 and is coupled through Zener diode 296 to the common connection. An output of operational amplifier A500 is coupled to terminal T35 and through resistor 298 to the first input terminal of operational amplifier A500. Terminal T11 is coupled to a power supply terminal of operational amplifier A500 and through capacitor 299 to the common connection, while a common terminal of operational amplifier 500 is coupled to the common connection of the apparatus. Terminal T23, activated by applying a positive voltage of 15 volts in the preferred embodiment, enables the AND gates 234 and 235 (as well as logic AND gates controlling Power Train B not shown) permitting a build up of voltage across the output terminals T3 and T4 of the power supply. Terminal T35 is temporarily held at ground potential, thereby disabling the under-voltage fault condition described below. Otherwise, an under-voltage condition can be detected by the fault apparatus during build up of the potential across the output of the power supply. The output terminal of inverter amplifier 291 provides an enabling potential to permit the development of the error signal controlling the inverter circuit.

Terminal T24 is also activated, in the preferred embodiment, by the application of a positive 15 volt potential. Terminal T24 is connected through the diode 255 and resistor 256 to an input terminal of inverter amplifier 257. An output of inverter amplifier 257 is coupled through the diode 279 to one terminal of resistor 281 and an anode terminal of diode 283. A second terminal of resister 281 is coupled to a strobe terminal of the operational amplifier A 280. The application of a zero voltage level to an operational amplifier strobe terminal causes the output terminal to be disconnected or to "float" electrically. (An example of an Operational Amplifier of this type is the National Semiconductor Company, Type 311 Operational Amplifier). The second terminal of resistor 281 is also coupled through capacitance 282 to the common connection. Activation of terminal T24 turns off the power supply.

Terminals T26 and T27 are fault detection terminals. A positive voltage of approximately 15 volts applied to terminal T26 or a zero voltage applied to terminal T27, causes the voltage regulating apparatus to terminate operation of the power supply. Appropriate voltages are applied to these terminals in the presence of fault conditions. Terminal T27 is coupled to a base terminal of PNP transistor 264 and through resistor 263 to terminal T10. An emitter terminal of transistor 264 is coupled through resistor 266 to ground and through diode 265 to terminal T10. A collector of transistor 264 is coupled through resistor 261 to terminal T26 and to an input terminal of inverter amplifier 262. An output terminal of inverter amplifier 262 is coupled, through diode 267, to a first terminal of resistor 268. A second terminal of resistor 268 is coupled through capacitor 269 to the common connection and to a strobe terminal of operational amplifier A270. The application of a (nearly) zero voltage to terminal T27 or a positive voltage of 15 volts applied to terminal T26 causes the output terminal of amplifier A270 to be electrically disconnected or to "float." The output terminal of operational amplifier A270 is coupled through inverter amplifier 290 and through diode 283 to the first terminal of resistor 281. The application of an appropriate fault condition signal to terminal T26 or terminal T27 results in the output terminal of operational amplifier A280 being electrically disconnected. Consequently the operation of the power supply will be suspended by inhibiting enabling voltage from being applied to control grids of the SCR elements in the Power Trains.

The first input terminal of operational amplifier A270 is also coupled to terminal T31. Terminal T31 resets circuits of the fault detection apparatus simultaneously with the resetting of circuits in the voltage regulation circuits. Terminal T25 is a reset terminal. Application of a positive 15 volt signal, in the preferred embodiment, to terminal T25 causes operational amplifier A270 and consequently operational amplifier A280 to be placed in such a condition that the application of an appropriate signal to terminal T23 permits the resumption of operation of the power supply. Terminal T25 is coupled through diode 260, resistor 258, and inverter amplifier 259, and diode 271 to a first input terminal of operational amplifier A 270. The first input terminal of operational amplifier 270 is also coupled through capacitor 272 to a second input terminal of operational amplifier A270. The second input terminal of operational amplifier A270 is also coupled through resistor 274 to the common connection and, through resistor 273, to the first terminal of resistor 501. The first terminal of resistor 501 is coupled through resistor 275 to a first input terminal of operational amplifier A270, through resistor 276 to an output terminal of operational amplifier A270 and to a supply terminal of operational amplifier A270. The first input terminal of operational amplifier A270 is coupled through diode 278 to the output terminal of operational amplifier A270.

Terminals T10 and T11 are power supply terminals for the voltage regulating apparatus. In the preferred embodiment a voltage of +5 volts relative to the common connection is applied to terminal T10, while a voltage of +24 volts relative to the common connection is applied to terminal T11.

Figure 3:
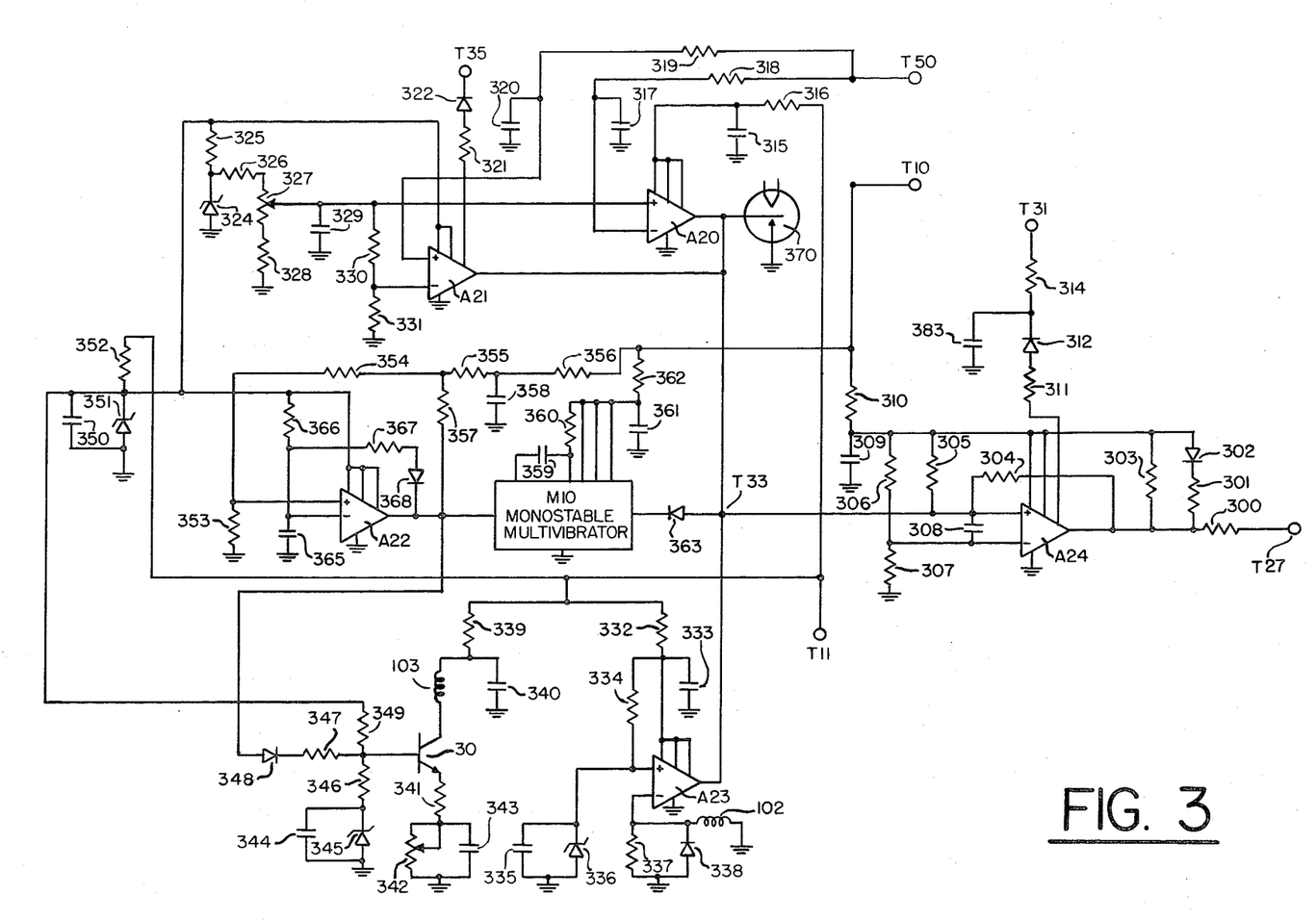
FIG. 3 is a circuit diagram of the apparatus which monitors fault conditions in the power supply and upon identification of the fault condition, delivers a signal for disabling the power supply.

Referring next to FIG. 3 and FIG. 4, apparatus for the detection of faults conditions is shown. The fault condition output terminal T27 can be coupled to an input terminal T27 of the voltage regulation circuit of FIG. 2. A zero binary logic level at the fault detection output terminal signals the presence of a fault to the voltage regulation circuit. The presence of a positive binary logic level at the fault detection circuit output terminal T27 signals to the control logic, the absence of a detection fault condition.

The signal of the fault condition output terminal is applied by operational amplifier A24. An output terminal of operational amplifier A24 is coupled through resistor 300 to the fault condition output terminal T27. The operational amplifier A24 are coupled to a first terminal of resistor 310 and through capacitor 309 to the common connection. A second terminal of resistor 310 is coupled to terminal T10. The first terminal of resistor 310 is also coupled to the output terminal of operational amplifier A24 through resistor 303, connected in parallel with a series combination of resistor 301 and diode 302. Diode 302 is a light emitting diode (LED) and produces visible radiation when the output terminal of operational amplifier A24 signals detection of a fault condition. The first terminal of resistor 310 is further coupled through resistor 305 to a first input terminal of operational amplifier A24. A second input terminal of operational amplifier A24 is coupled through capacitor 308 to the first input terminal of operational amplifier A24, through resistor 307 to the common connection and through resistor 306 to the first output terminal of resistor 310. Feedback resistor 304 is coupled between the first input terminal and the output terminal of operational amplifier A24. A strobe terminal of operational amplifier A24 is coupled through resistor 311, diode 312 and resistor 314 to terminal T31. The coupling between resistor 314 and diode 312 is coupled through capacitor 383 to the common connection. When terminal T31 receives a zero binary logical signal, the output of operational amplifier A24 is electrically disconnected and the fault detection apparatus output terminal T27 produces positive binary logic signal. Terminal T31 is set to a zero binary logic signal during the resetting of the power supply to remove a fault condition signal, which would suspend operation of the voltage regulation circuit.

The first input terminal of operational amplifier A24 is connected to terminal T33. Terminal T33 contains a positive binary logic signal in the absence of a detected fault condition and a zero binary logic signal when one of several fault conditions exists.

Coupled to terminal T33 is a thermostat 370. The thermostat is arranged so that an over-temperature of the power supply (e.g., cooling plates) closes the switch of the thermostat 370, coupling terminal T33 to ground and consequently signalling a fault condition at output terminal T27.

The output terminal of operational amplifier A20 provides a zero binary logic signal at terminal T33 when the output voltage of the power supply at terminals T3 and T4 exceeds a predetermined amount. Operational amplifier A20 is coupled to terminal T11 through a resistor 316 and to the common connection through capacitor 315. A second input terminal of operational amplifier A20 is coupled through a resistor 318 to terminal T50 and through capacitor 317 to the common connection. A first input terminal of operational amplifier A20 is coupled through a resistance dividing network consisting of resistor 328, a potentiometer 327 and resistor 326 connected in series across a reference voltage comprised of a Zener diode 324. The Zener diode which provides a stable reference voltage receives current from terminal T11 through resistor 352 and resistor 325. The first input terminal of operational amplifier A20 is coupled through capacitor 329 to the common connection. Operational amplifier A21 is also coupled to reference potential determined by the Zener diode. The function of operational amplifier A20 is to provide a zero logic level at terminal T33 when the voltage terminal T50 rises above a reference voltage determined by the Zener diode 324 and the associated resistance dividing network. Terminal T50 and the common connection of the fault detection apparatus are coupled to output terminals T3 and T4 of the power supply.

Similarly, operational amplifier A21 provides a zero binary signal at terminal T35 when the voltage supplied to the first input terminal of operational amplifier A21 falls below a certain predetermined value. The voltage value applied to the first input terminal of operational amplifier A21 is reduced by the ratio of resistances of a resistance dividing network consisting of resistors 330 and resistor 331. The first input terminal of operational amplifier A21 is coupled through resistor 319 to terminal T50 and through capacitor 320 to the common connection. In addition, the operational amplifier A21 has a strobe terminal coupled through resistor 321 and diode 322 to an under-voltage inhibit terminal T35. The under-voltage inhibit terminal T35 has applied to it a zero logic signal from the voltage regulating apparatus during initiation of operation of the power supply. The presence of an under-voltage during the build-up of voltage is thus prevented from causing a fault condition to appear at terminal T35.

Figure 4A:
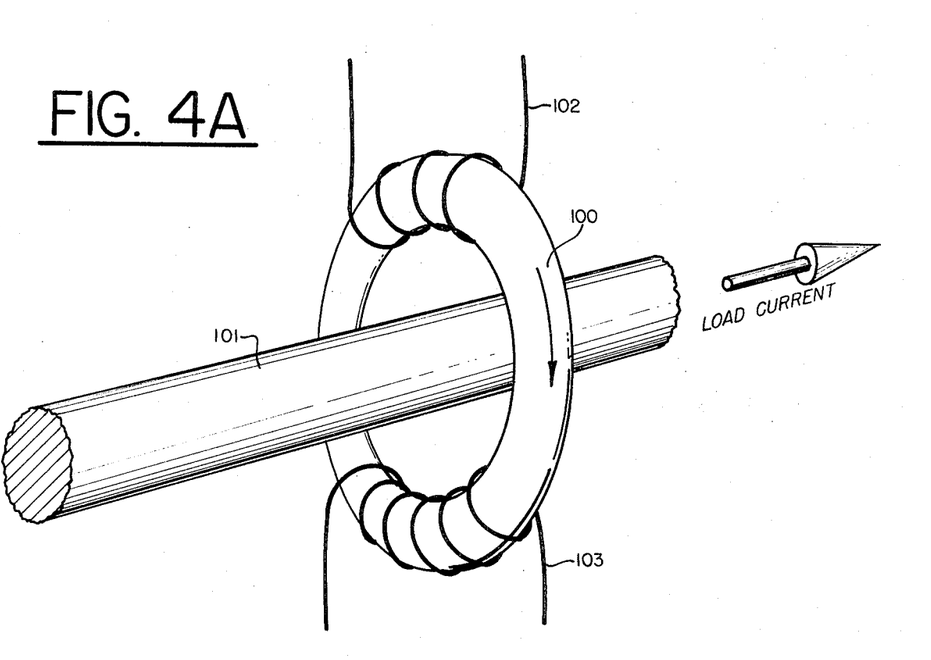
FIG. 4 is a schematic diagram of apparatus and mode of operation of the apparatus used to monitor power supply output current.
Figure 4B:
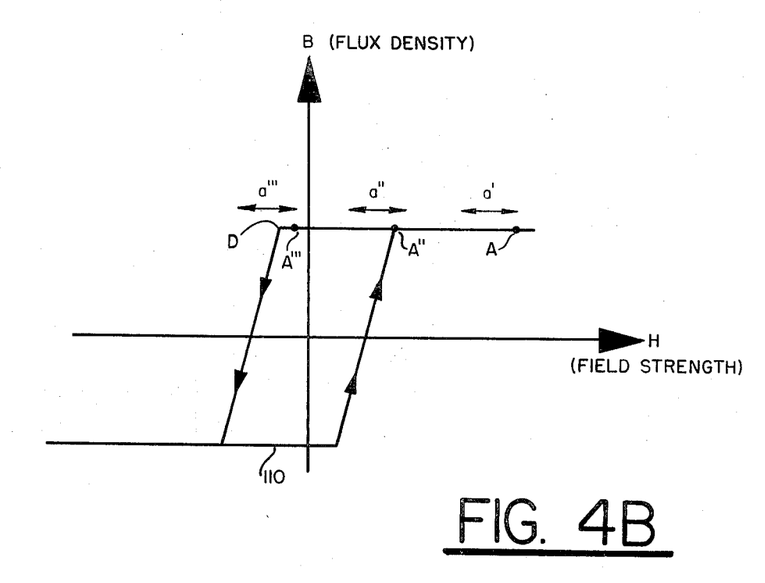

The remaining elements of FIG. 3 are for the detection of a load current exceeding a selected value from the power supply. The method of detection can best be understood by consideration of FIG. 4. In FIG. 4a, the main conductor of load current is shown schematically by element 101. The main current conductor passes through a core of magnetic material labeled 100. Two coils, 102 and 103, are wound on the magnetic core 100. Referring now to FIG. 4b, an idealized hysteresis loop is shown by curve 110. For a given DC current in winding 103 the operating point of the hysteresis loop can be designated by point A. Small negative pulses of current are periodically applied to winding 103. This causes the field strength H to vary periodically from the steady state operating point of A' in a manner shown by a'. As the load current in conductor 101 is increased, the operating point will shift along the field strength H cordinate to operating point A'' (because of the selection of the direction of DC current in coil 103.) Again, the periodic change of field strength below operating point A'' shown in FIG. 4b as a''. When the current becomes enough for the operating point to be near the break in the hysteresis loop, as shown by operating point A''', negative current pulses shown by a''' will cause the field strength to go over the knee (D) of the hysteresis loop. When the field strength goes beyond the break in the hysteresis loop, a significant change in the flux density occurs in the magnetic coil. This changing flux density produces a voltage in the coil 102. Thsu, by choosing an operating condition determined by the steady value of current through coil 103, a voltage will be detected in coil 102, when the load current exceeds a selected value. The value of this operating point can be chosen so that the load current is the maximum allowable current and the signal in coil 102 is used to produce a shut-down of the power supply resulting from the over-current condition.

Referring again to FIG. 3, a first terminal of coil 103 is coupled through a resistor 339 to terminal T11 and through capacitor 340 to the common connection. A second terminal of coil 103 is coupled to a collector of transistor 30. An emitter of transistor 30 is coupled through resistor 341 and potentiometer 342 to the common terminal. The terminals of potentiometer 342 are coupled to the terminals of capacitor 343 while the variable terminal of potentiometer 342 is coupled to one of the fixed terminals. A base of transistor 30 is coupled through resistor 346, coupled in series with a parallel connection of capacitor 344 and Zener diode 345 to the common connection. The base of transistor 30 is also coupled through resistor 349 to Zener diode 351. This circuit provides the DC biasing for transistor 30 establishing the DC current flowing through coil 103.

The periodic fluxuation of current in transistor 30 is provided by the coupling of a base transistor 30 through resistor 347 and diode 348 to the output terminal of operational amplfier A22. Operational amplifier A22 is coupled to Zener diode 351. Zener diode 351 is coupled through resistor 366 to a second input terminal of operational amplifier A22. The second input terminal of operational amplifier A22 is coupled through capacitor 365 to the common connection and through resistor 367 and diode 368 to the output terminal of amplifier A22. The output terminal of operational amplifier A22 is coupled through resistor 359 and resistor 354 to a first input terminal of operational amplifier A22. The first input terminal of operational amplifier A22 is also coupled through resistor 353 to the common connection. The coupling between resistor 354 and resistor 357 is coupled through resistor 355 and resistor 356 to terminal T10. The coupling between resistor 355 and resistor 356 is coupled through capacitor 358 to the common connection. This circuit arrangement causes operational amplifier A22 to provide a periodic variation in voltage at the output terminal of operational amplifier A22. These variations in the output terminal voltage result in periodic fluxuations of the current flowing through coil 103 because of the coupling to the base of transistor 30 through diode 348 and resistor 347.

When the power supply current is above the selected value a periodic voltage is impressed across coil 102. Coil 102 is coupled between ground and a second input terminal of operation amplifier A23. The second input terminal of operational amplifier A23 is also coupled through resistor 337 and diode 338, connected in parallel, to the common connection. A first input terminal of operational amplifier A23 is coupled to ground through capacitor 335 and Zener diode 336, connected in parallel, to the common connection. The first input terminal of operational amplifier A23 is also coupled through resistor 334 and resistor 332 to terminal T11. The coupling of resistor 334 and resistor 332 is coupled through capacitor 333 to the common connection, and is further coupled to operational amplifier A23 supply terminals. The output terminal of operational amplifier A23 is coupled to terminal T33. When an alternating voltage appears across coil 102, the output terminal of operational amplifier A23 becomes a zero binary logic condition. This condition in turn causes a zero binary logic signal or fault condition signal to appear at terminal T27.

The output terminal of operational amplifier A22 is also coupled to an input terminal of a monostable multivibrator M10. The monostable multivibrator M10 is coupled to terminal T10 through a resistor 362 and to the common connection through capacitor 361. Resistor 360 and capacitor 359 are also coupled to monostable multivibrator M10 and determine the period of time in which M10 remains in an astable state. Thus, resistor 360 and capacitor 359 determine the time constant of monostable multivibrator M10. The application of a voltage pulse from operational amplifier A22 causes the monostable multivibrator M10 to assume the astable state. The monostable multivibrator will remain in this astable state for a period of time determined by the time constant. If a further pulse has not been received from operational amplifier A22, then the monostable multivibrator assumes its stable position and applies a zero binary logic signal to terminal T33 through diode 363. However, the application of another pulse from amplifier A22 within the period of time determined by the time constant causes the monostable multivibrator to remain in its astable with a positive logic signal maintained on the output terminal. Thus the monostable multivibrator assures that the operation of the oscillator providing the verification of the over-current sensing apparatus operation. In the absence of this device, the failure of operational amplifier A22 or associated circuitry would allow an undetected over-current condition to remain undetected.

Terminals T10 and T11 are terminals for supplying voltage to the active circuit elements. In the preferred embodiment, +5 volts is applied to terminal T10 and +24 volts is applied to terminal T24.

OPERATION OF THE PREFERRED EMBODIMENT

Referring again to FIG. 1, the Power Train A of the power supply is shown in detail. In the preferred embodiment, two identical Power Trains A and B are employed. For relatively small input power voltage levels, Power Train A is coupled in parallel with Power Train B, i.e., terminal T1 is coupled to terminal T5, while terminal T2 is coupled to terminal T6. For relatively large input power voltage levels, Power Train A is coupled in series with Power Train B, i.e., terminal T2 is coupled to terminal T5, the input power voltage being applied to terminals T1 and T6. The effect of the (series) coupling is to distribute the relatively large input power voltage level equally between Power Train A and Power Train B.

In FIG. 1, two input terminals have been shown for clarity. However, in the preferred embodiment, three input terminals, applying three voltage phases to the power supply are coupled to the rectifiier.

The group of elements enclosed in dotted lines labeled 100 comprises the inrush-current limiting device. The operation of this device is described in detail in the co-pending U.S. Pat. application No. 320,038, filed on even date with the present application, and assigned to the assignee of the present invention.

Capacitor 51 is the storage capacitor for the power supply. Resistor 127 is the bleeder resistor for the storage capacitor 51.

Capacitors 52 and 53, transformers 55 and 57, and SCRs 54 and 56 comprise the inverter circuit for the Power Train A. Under control of the control apparatus comprising the voltage regulating circuit and the fault detection circuit, SCR 54 and SCR 56 are fired sequentially thereby converting the DC voltage of the storage capacitor 51 in the secondary windings of the transformers 55 and 57 to an AC voltage.

Diodes 58 and 59 rectify the AC voltage in the secondary windings of the transformers 55 and 57. This current is then filtered through elements 61, 60 and 62. The resulting voltage is applied to terminal T3 through a coupling 155 which provides a coupling to the control apparatus and to terminal T4 through element 156 (also coupling to the control apparatus). The output voltage of the Power Train B is also applied to this filter, thus contributing to the power delivered to the output terminals T3 and T4 of the power supply.

The amount of power delivered by the power supply can be varied by the changing rate of the sequential firing of the SCR elements 54 and 56. A more rapid sequential firing permits more current and therefore higher voltage to be provided to the terminals T3 and T4. The firing of these SCR elements is determined by the voltage regulating circuit of the control apparatus of the power supply.

Referring again to FIG. 2, the voltage regulating circuit of control apparatus is shown. The voltage across output terminals T3 and T4 is applied to the voltage regulating feedback circuit. This voltage is compared with a reference voltage level determined by the Zener diode 208. A comparison of the power supply output voltage and the reference voltage is performed with operational amplifier A210. The voltage difference is converted to a change in current from an equilibrium value in transistor 218. In turn the change in equilibrium current causes the signal frequency applied to the monostable multivibrator 228 and to the counter (labelled as elements 232 and 233 respectively) from transistor 222 and differential amplifier 230 to be altered. Monostable multivibrator 228 provides a well defined enabling pulse for logic AND gates 234 and 235. The function of the two counter circuits is to provide enabling pulses for the logic AND gates 234 and 235 simultaneously with the output pulses from the monostable multivibrator 228, but arranged so that trigger pulses to SCR elements 54 and 56 occur sequentially. In the preferred embodiment capacitor 223 can be altered to alter the equilibrium signal frequency. In the preferred embodiment, biasing circuits similar to those shown at the output circuits of logic gates 234, 235 are provided for the SCR inverter elements of Power Train B. The counter circuits provide pulses which trigger conduction in the SCR inverter elements of Power Train B between the triggering of the SCR elements in Power Train A. The logic AND gates 234 and 235 are also enabled by the output of an inverter amplifier 250.

The application positive voltage (of +15 volts in the preferred embodiment) to terminal T23 is used to begin the operation of the voltage regulating circuit. The result of the application of this voltage to terminal T23 is to apply a zero binary logic signal to the output terminal of operational amplifier A280. This logic signal, coupled through inverter 250, enables the logic AND gates driving the SCR elements of the Power Trains. The zero binary logic signal at the output of operational amplifier A280 causes a positive binary logic signal at the output terminal of inverter 291. This logic signal serves at least two purposes. First, this signal enables the output of operational amplifier A210 thereby permitting the regulation of the voltage terminal T3 and T4. And secondly, this positive binary logic signal enables amplifier A500 which applies a zero binary logic signal to terminal T35. The function of the signal at terminal T35 is to disable the fault apparatus termporarily until voltage has built up across terminal T3 and T4. The fault apparatus, if not disabled, immediately senses the under-voltage at the output terminal T3 and T4, determines it to be detected a fault condition and therefore disables the operation of power supply. Therefore, this fault condition detection apparatus must be disabled temporarily at a beginning of power supply operation.

To terminate the operation of the power supply above, a positive voltage signal is applied to T24. This voltage signal is coupled to the strobe or disabling terminal of the operational amplifier A280 through resistor 281. In the presence of a positive voltage across terminal T24, the output of operational amplifier A280 will float, causing the output signals of inverting amplifier 291 and 250 to become zero binary logic signals. The presence of zero binary logic signals at these amplifier output terminals suspends the operation of voltage regulating circuit and consequently of the power supply.

A positive (+15 volts in the preferred embodiment) signal applied to terminal T26 or a zero voltage signal applied to terminal T27, signals to the voltage regulating circuit the presence of the fault condition. The response of the voltage regulating equipment to a detected fault condition is to suspend operation by no longer triggering conduction in the Power Train SCR elements. A fault condition will disable the operation of amplifier A270 by applying a zero potential the strobe or disabling terminal of the operational amplifier. Further, the disabling of operational amplifier A270 automatically, through circuit elements 290 and 283 disables, operational amplifier A280. Thus in the presence of a detected fault condition, the entire voltage regulating circuit will be disabled, suspending the operation of the inverter circuits in the Power Train A.

Terminal T25 is employed after a fault condition has been detected and the operation of the voltage regulating circuit has been suspended. A positive signal (+15 volts in the preferred embodiment applied to T25 resets circuit conditions associated with operational amplifier A24 of the fault detection apparatus as well as the circuit condition associated with operational amplifier A280 and operational amplifier A270 of the voltage regulating circuit. However, the operational amplifiers will be disabled immediately if the fault condition has not been removed from terminal T26 or terminal T27. The reset mechanism is automatically set in operation when the elements applying the activation voltage to terminal T23 are switched to the on position1.

Referring next to FIG. 3, the apparatus for detecting faults is shown. Terminal T27 is connected to terminal T27 of FIG. 2 and the application of the zero binary logic signal causes the voltage regulating circuit to be disable. A fault condition will be established by a binary logic signal condition at terminal T33. A zero binary logic signal will be applied to terminal T33 if the thermostatic elements become too hot. In the event of over-heating of cooling elements, the control element of thermostat 370 is coupled to ground, thereby producing a zero binary logic signal and causing the voltage regulating apparatus to be suspended.

Operational amplifier A21 monitors an under-voltage condition between terminals T3 and T4 while operational amplifier A20 determines an over-voltage condition, between terminals T3 and T4. As described above, the under-voltage detection apparatus is disabled during the initiation of operation of the power supply or the under-voltage automatically be present at this time, the disabling of the under-voltage detection system is accomplished by applying the signal from the voltage regulation circuit to terminal T35.

In order to detect an over-current condition, operational amplifier A22 is used to create a signal of predetermined frequency. Referring again to FIG. 4A, this signal is applied to a coil 103, containing a DC current, wound on a core 100 of magnetic material. The output conductor (i.e., connection 73) of the power supply passes through the center of core 100. If the current in the output conductor of the power supply exceeds a predetermined value, the contribution of Field Strength H in core 100 due to the DC component of the current in coil 103 is balanced by the Field Strength H in core 100 due to the load current, then a signal due to AC component applied to coil 103, is produced across coil 102. The presence of a signal across coil 102 will produce a zero binary logic signal at the terminal T33, thereby producing a fault signal at terminal T27. The presence of the detected fault condition causes the operation of the power supply inverter circuit to be suspended.

Because of the critical nature of the over-current condition and the possible damage to the power supply components or the component to which power is being supplied, further protection has been included. Monostable multivibrator M10 is coupled to the output of operational amplifier A22. A halting of the oscillation or a substantial decrease in frequency of oscillation will cause the monostable multivibrator M10 to return to a stable state after a time determined by the elements 359 and 360, and a zero logic signal will be applied to terminal T33.

The above description is included to illustrate the operation of the preferred embodiment and is not meant to limit the scope of the invention. The scope of the invention is to be limited only by the following claims from the above discussion, many variations will be apparent to one skilled in the art that would yet be encompassed by the spirit and scope of the invention.

What is claimed is:

1. An electronic power supply comprising:
   means for storing electronic charge, said stored charge providing a DC intermediate signal;
   means for transferring charge from an input power source and applying said charge to said storage means;
   an inverter circuit coupled to said storage means, said inverter circuit producing an AC signal from said DC intermediate signal;
   means for producing an DC output signal from said AC signal, said output means coupled to said inverter circuit;

control apparatus coupled to said output means and said inverter circuit, wherien a frequency of said AC signal is determined by said DC output voltage;

wherein a first power train includes said storage means, said input means, said inverter means, and said output means, said power supply further including a second power train substantially identical to said first power train and further including said control apparatus, wherein said output means of said first power train is coupled to an output means of said second train, wherein said input means of said power train and an input means of said second power train can be coupled in a series and in a parallel combination.

2. An electronic power supply comprising:
means for storing electronic charge, said stored charge providing a DC intermediate signal;
means for transferring charge from an input power source and applying said charge to said storage means;
an inverter circuit coupled to said storage means, said inverter circuit producing an AC signal from said DC intermediate signal; embodiment) position.
means for producing an DC output signal from said AC signal, said output means coupled to said inverter circuit;
control apparatus coupled to said output means and said inverter circuit, wherein a frequency of said AC signal is determined by said DC output voltage;

wherein said control apparatus comprises:
a voltage regulating circuit, said voltage regulating circuit determining said AC signal frequency from a comparison of said DC output voltage and a reference voltage;
fault detection apparatus coupled to said regulating circuit, said fault detection apparatus applying a disabling signal to said regulating circuit in response to predetermined condition in said power supply; and
wherein said fault detection apparatus includes apparatus for producing said disabling signal in response to said DC output signal being less than a predetermined voltage, and wherein said regulating circuit produces a temporary disabling signal for disabling said under-voltage detection apparatus during a initial build-up of voltage of said DC output signal.

3. An electronic power supply comprising:
means for storing electronic charge, said stored charge providing a DC intermediate signal;
means for transferring charge from an input power source and applying said charge to said storage means;
an inverter circuit coupled to said storage means, said inverter circuit producing an AC signal from said DC intermediate signal;
means for producing a DC output signal from said AC signal, said output means coupled to said inverter circuit;
control apparatus coupled to said output means and said inverter circuit, wherein a frequency of said AC signal is determined by said DC output voltage;
wherein said control apparatus comprises:
a voltage regulating circuit, said voltage regulating circuit determining said AC signal frequency from a comparison of said DC output voltage and a reference voltage;
fault detection apparatus coupled to said regulating circuit, said fault detection apparatus applying a disabling signal to said regulating circuit in response to predetermined condition in said power supply;
wherein said fault detection apparatus includes apparatus for producing said disabling signal in response to a current above a preselected value being delivered by said power supply, said overcurrent apparatus including:
a magnetic material;
means for biasing said magnetic material in a region of magnetic field strength saturation;
means for coupling a field due to said current so as to reduce said magnetic field strength saturation, said magnetic field strength being unsaturated at approximately said preselected current value; and
means for sampling said magnetic field strength of said magnetic material, an unsaturated magnetic field strength producing said disabling signal by said sampling means.

4. The power supply of claim 3, wherein said sampling means periodically tests said magnetic material for an unsaturated value of magnetic field strength, further including means for testing said sampling means to determine if said magnetic field strength is tested within a pre-established period, a failure to test said magnetic field within said pre-established period producing said disabling signal.

5. An electronic power supply comprising:
means for storing electronic charge, said stored charge providing a DC intermediate signal;
means for transferring charge from an input power source and applying said charge to said storage means;
an inverter circuit coupled to said storage means, said inverter circuit producing an AC signal from said DC intermediate signal;
means for producing a DC output signal from said AC signal, said output means coupled to said inverter circuit;
control apparatus coupled to said output means and said inverter circuit, wherein a frequency of said AC signal is determined by said DC output voltage;

wherein said control apparatus comprises:
a voltage regulating circuit, said voltage regulating circuit determining said AC signal frequency from a comparison of said DC output voltage and a reference voltage;
fault detection apparatus coupled to said regulating circuit, said fault detection apparatus applying a disabling signal to said regulating circuit in response to predetermined condition in said power supply;
wherein said fault detection means comprises:
means for detecting a voltage level of said DC output signal above a first predetermined value;
means for detecting a voltage level of said DC output signal below a predetermined second value;

means for detecting a current level for said DC output signal above a predetermined third value; and means for applying said disabling signal upon detection of said over-voltage condition, said under-voltage condition and said over-current condition.

6. The power supply of claim 5 wherein said fault detection means further comprises means for verification of the operation of said over-current detection means.

7. The power supply of claim 6 wherein said means for detecting over-current comprises an oscillator applying a varying magnetic field to a magnetic material and wherein said verification means generates said disabling signal when a frequency of said varying magnetic field produced by said oscillator falls below a selected value.

8. An improved electronic power supply of the type having switching elements arranged in an inverter circuit, said inverter circuit producing an AC signal from a DC signal, and voltage regulating means for controlling an output signal from said power supply, wherein the improvement comprises:
a fault detection circuit coupled to said output signal and said voltage regulating means, said fault detection circuit producing a signal disabling said regulation means upon detection of at least one preselected condition,
wherein said fault detection circuit includes apparatus for detection of output current above a preselected first value comprising:
means for applying a magnetic field from said output current to said magnetic field;
means for detecting when said output current magnetic field exceeds a preselected magnetic field strength in said magnetic material; and
means for producing said disabling signal when said output current magnetic field strength exceeds a pre-established value.

9. The power supply of claim 8 wherein said fault detection circuit further includes:
means for verifying the operation of said detection means; and
means for producing said disabling signal upon determination of malfunction of said detection means.

10. An improved electronic power supply of the type having switching elements arranged in an inverter circuit, said inverter circuit producing an AC signal from a DC signal, and voltage regulating means for controlling an output signal from said power supply, wherein the improvement comprises:
a fault detection circuit coupled to said output signal and said voltage regulating means, said fault detection circuit producing a signal disabling said regulation means upon detection of at least one preselected condition;
wherein said fault detection circuit includes means for producing said disabling signal when said output signal voltage is below a preselected value; and
means for disabling said under-voltage detection means during an initial build-up of said output signal voltage.

11. An electronic power supply comprising:
a storage capacitor for storing electronic charge;
a first circuit including:
a first silicon-controlled rectifier (SCR); and
a first capacitor coupled to said first SCR and first transformer;
a second circuit including:
a second SCR;
a second transformer coupled to said second SCR, and
a second capacitor coupled to said second SCR and said second transformer, wherein said first circuit is coupled to said storage capacitor, and wherein said second circuit is coupled to said first circuit and to said storage capacitor;
a rectifier filter circuit coupled to said first and second transformer, said rectifier filter circuit supplying an output voltage for said power supply;
control apparatus coupled to said output voltage and coupled to said first and second SCRs, said control apparatus producing bias signals causing said first and said second SCRs to become conducting sequentially, an interval between conducting states of said first and said second SCR established by said output voltage, wherein said control apparatus is disabled from producing said bias signals upon detection of preselected conditions in said power supply;
wherein said control apparatus includes:
means for detecting a preselected output under-voltage conditions;
means for detecting a preselected output over-voltage condition; and
means for detecting a preselected over-current condition.

12. The power supply of claim 11 wherein said control apparatus includes means for disabling said under-voltage detection means during an initial build-up of said output voltage.

13. The power supply of claim 12 wherein said control apparatus includes:
means for verification of said over-current detection means, said bias signals being disabled upon malfunction of said over-current detection means.

14. The power supply of claim 13 wherein said over-current detecting means comprises an oscillator for producing a periodic signal, and wherein said verification means comprises a monostable multivibrator, said monostable multivibrator coupled to said oscillator, wherein bias signals are disabled when said periodic signal has a periodicity less that the periodicity of an astable state of said monostable multivibrator.

* * * * *